United States Patent
Ford

(10) Patent No.: US 6,168,182 B1
(45) Date of Patent: Jan. 2, 2001

(54) Y-SHAPED TOW BAR HAVING A CHANNEL ADAPTED TO CONCEAL AND PROTECT AN ASSOCIATED CABLE

(75) Inventor: Bill C. Ford, Elma, WA (US)

(73) Assignee: Billy C. Ford, Elma, WA (US)

( * ) Notice: Under 35 U.S.C. 154(b), the term of this patent shall be extended for 0 days.

(21) Appl. No.: 09/262,161

(22) Filed: Mar. 3, 1999

(51) Int. Cl.[7] ............................................. B60D 1/167
(52) U.S. Cl. ............................ 280/494; 280/420; 280/422
(58) Field of Search ............................ 280/420, 421, 280/422, 493, 494, 491.4

(56) References Cited

U.S. PATENT DOCUMENTS

| | | | |
|---|---|---|---|
| 3,400,293 | * | 9/1968 | Reichardt ............................. 280/422 |
| 3,817,558 | * | 6/1974 | Eger ................................. 280/491.4 |
| 5,066,034 | * | 11/1991 | Carr ..................................... 280/420 |
| 5,082,217 | * | 1/1992 | Parker et al. ......................... 280/421 |
| 5,306,037 | * | 4/1994 | Robertson ............................. 280/495 |
| 5,765,851 | * | 6/1998 | Parent ............................... 280/491.4 |
| 5,915,715 | * | 6/1999 | Ford ..................................... 280/494 |
| 5,957,475 | * | 9/1999 | Pearen et al. ......................... 280/409 |
| 6,089,907 | * | 7/2000 | Shoblom ............................... 280/422 |

* cited by examiner

Primary Examiner—Eric Culbreth
Assistant Examiner—Michael Cuff
(74) Attorney, Agent, or Firm—Timothy E. Siegel

(57) ABSTRACT

A tow bar having a body portion, adapted to be attached to a towing vehicle and a pair of legs joined to the body portion and adapted to be attached to a towed vehicle. At least one of the legs defines a closed channel that can be opened to form an open channel. The channel is generally adapted to partially conceal and protect a safety cable of the sort generally required to be used in association with a tow bar.

5 Claims, 3 Drawing Sheets

Y-SHAPED TOW BAR HAVING A CHANNEL ADAPTED TO CONCEAL AND PROTECT AN ASSOCIATED CABLE

BACKGROUND OF THE INVENTION

The present invention has to do with a tow bar that includes a closed channel that can be opened. The general purpose of the channel is to protect and hide the safety and electrical cables that connect the towing and towed vehicles.

Y-shaped tow bars are used to link, yet spatially separate, a towing vehicle and a towed vehicle. Many jurisdictions require that tow bars be used in conjunction with safety cables so that if the tow bar somehow becomes detached from either the towing or the towed vehicle, the safety cables will retain the towed vehicle behind the towing vehicle until the problem can be fixed. Also, it is typically necessary to provide electrical cabling between the towing and the towed vehicle so that, for example, the brake lights of the towed vehicle may be operated by the brakes of the towing vehicle. Not only are these cables and wires somewhat unsightly, but they also tend to become corroded in their exposed state.

SUMMARY

The present invention comprises a tow bar having a body portion, adapted to be attached to a towing vehicle and a pair of legs joined to the body portion, each leg adapted to be attached to a towed vehicle and at least one of the legs defining a closed channel that can be opened to form an open channel.

In a separate aspect the present invention is a method for partially concealing and protecting a towing safety cable, comprising the following steps. First, the present invention includes the step of providing a tow bar having a body portion adapted to be attached to a towing vehicle and a pair of legs joined to the body portion, with each leg adapted to be attached to a towed vehicle and at least one the legs defining a closed channel that can be opened to form an open channel. Next, the invention includes opening the closed channel to form an open channel and placing the cable in the open channel. Finally, the invention includes closing the open channel to reform the closed channel, which partially conceals and protects the cable.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figure 1:
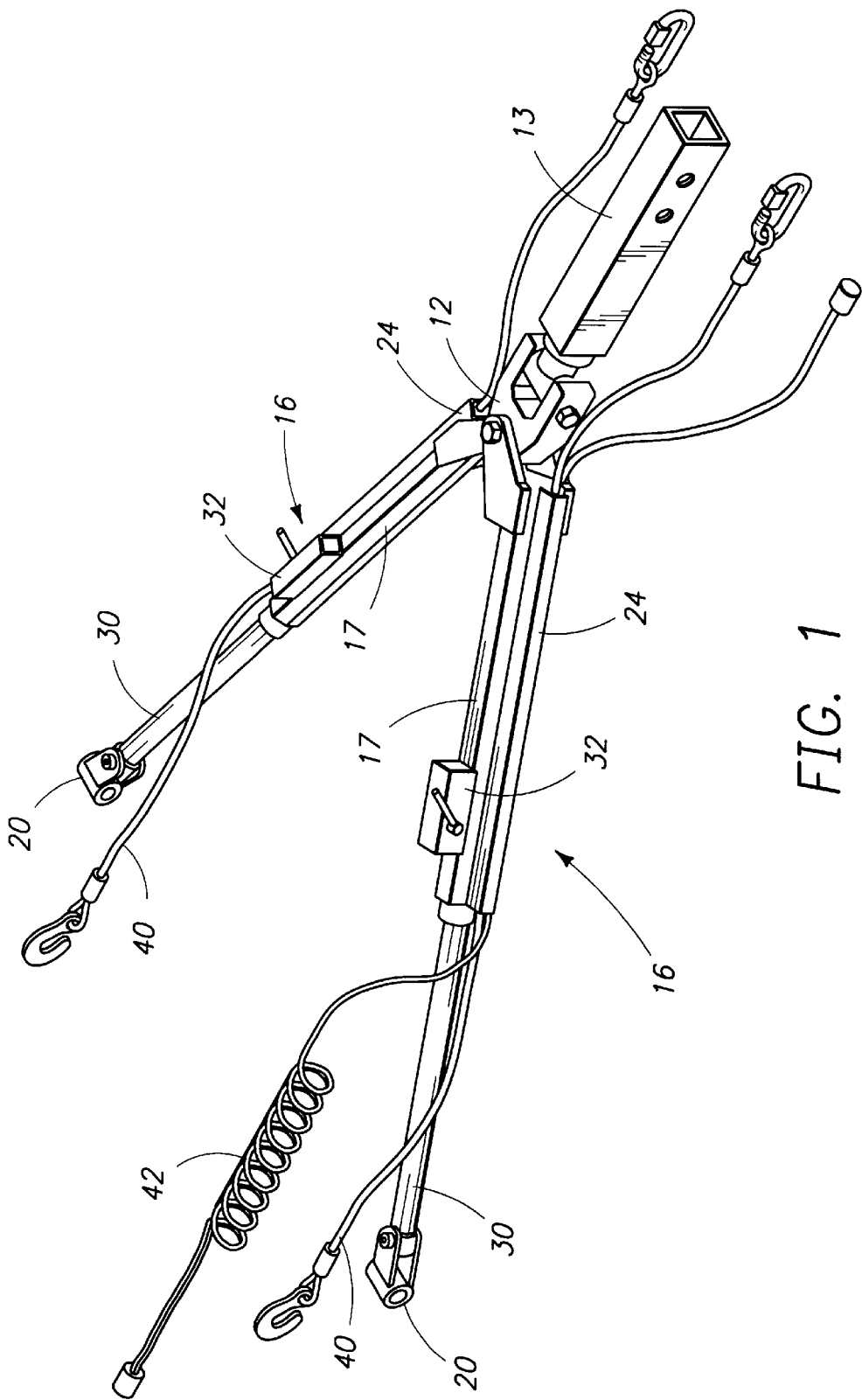
FIG. 1 is an isometric view of a tow bar according to the present invention.

Referring to FIG. 1, a preferred embodiment of a tow bar 10 according to the present invention includes a body portion 12 that includes a hinged connector 13 adapted to fit into a square port of the type that is very common in motor homes. A pair of legs 16 are hinged to body 12 and each include a cylindrical attachment member 20 for connecting to a towed vehicle (typically an automobile). In this embodiment, each of a pair of main leg shafts 30 are extensible from a main body portion 17 of legs 16 and may be locked in place by one of a pair of locking mechanism 32. Each locking mechanisms 32 includes an associated cushioning mechanism that is described in U.S. patent application Ser. No. 08/923,513, which shares identical inventorship and ownership with the present application and is hereby incorporated by reference as if fully set forth herein.

Figure 2:
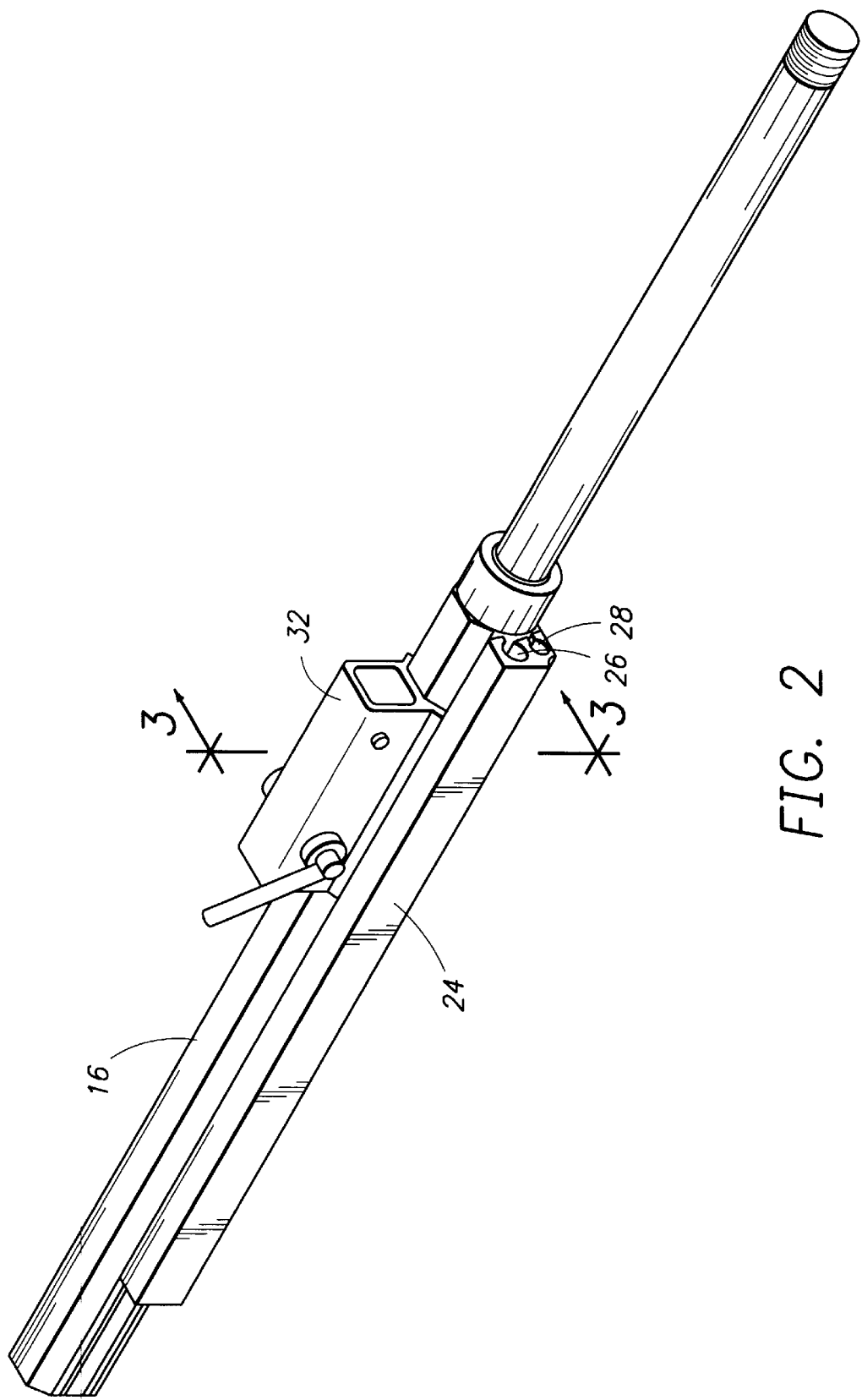
FIG. 2 is an isometric view of a leg of the tow bar of FIG. 1.
Figure 3:
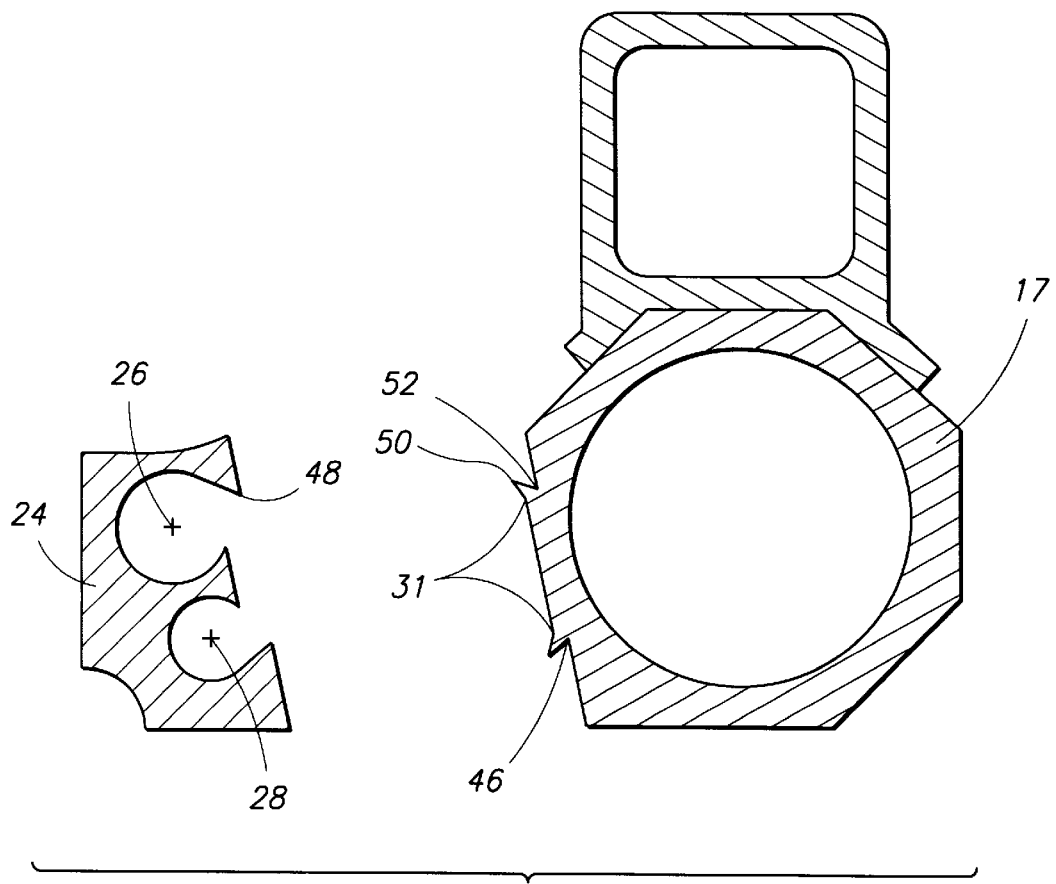
FIG. 3 is a cross-sectional view of the leg of FIG. 2 taken along view line 3—3 of FIG. 2.

Referring to FIGS. 1 and 2, a channel defining member 24 is slidably engaged with each leg portion 17 by way of a track 31. Channel defining member 24 defines a first, larger channel 26 and a second, smaller channel 28. When member 24 is slidably engaged with leg portion 17, channels 26 and 28 are closed channels. When member 24 is disengaged, as is shown in FIG. 3 channel 26 and 28 are rendered open channels.

A user may use member 24 to protect and hide a safety cable 40 and an electrical wire 42 by first slidably disengaging member 24 from the main body portion 17, placing the safety cable in channel 26 and the electrical wire in channel 28 and then slidably engaging member 24 with leg portion 17, thereby closing channels 28 and 26 and positively retaining cable 40 and wire 42.

Skilled persons will recognize that many other configurations are possible to provide closed channels that may be opened, running along the leg portions 17. For example, members such as members 24 could be hinged to leg portions 17. Alternatively, channels could be formed in leg portions 17, with a hinged panel closing the channels when desired. In another alternative, if the bottom trough 46 of track 31 were increased in size and depth a member such as member 24 could be pushed inwardly and upwardly onto leg portion 17 until a top rim 48 is moved above and clears a top rim 50 and is placed into a trough 52, thereby interlocking the member such as member 24 and leg portion 17 to close channels 26 and 28. Preferably, tow bar 10 is made of extruded aluminum or steel.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A tow bar having:
   a) a body portion, adapted to be attached to a towing vehicle; and
   b) a pair of legs joined to said body portion, each said leg adapted to be attached to a towed vehicle and at least one said legs defining a lengthwise closed channel that can be opened to form an open channel.

2. The tow bar of claim 1, in which said closed channel is defined by a first portion and a second portion of said at least one leg, said first and second portions being slidingly engaged together to form said closed channel and further being slidingly disengageable to form said open channel.

3. The tow bar of claim 1 in which said closed channel is divided into two subchannels.

4. The tow bar of claim 1 in which each said leg defines a closed channel that can be opened to form an open channel.

5. A method of partially concealing and protecting a cable that connects a towing vehicle and a towed vehicle, comprising the steps of:
   a) providing a tow bar having:
      i) a body portion, adapted to be attached to said towing vehicle; and
      ii) a pair of legs joined to said body portion, each said leg adapted to be attached to said towed vehicle and at least one said legs defining a closed channel that can be opened to form an open channel;

b) connecting said tow bar to said towing and said towed vehicle;

c) opening said closed channel to form an open channel;

d) placing said cable in said open channel; and e) closing said open channel to form a closed channel that partially conceals and protects said cable.

* * * * *